(12) United States Patent
Miyazaki

(10) Patent No.: US 10,120,169 B2
(45) Date of Patent: Nov. 6, 2018

(54) VARIABLE-POWER OPTICAL SYSTEM

(71) Applicant: NIKON VISION CO., LTD, Shinagawa-ku, Tokyo (JP)

(72) Inventor: Yosuke Miyazaki, Ichihara (JP)

(73) Assignee: NIKON VISION CO., LTD., Tokyo (JP)

( * ) Notice: Subject to any disclaimer, the term of this patent is extended or adjusted under 35 U.S.C. 154(b) by 137 days.

(21) Appl. No.: 15/241,370

(22) Filed: Aug. 19, 2016

(65) Prior Publication Data

US 2016/0356996 A1 Dec. 8, 2016

Related U.S. Application Data

(63) Continuation of application No. PCT/JP2015/000788, filed on Feb. 19, 2015.

(30) Foreign Application Priority Data

Feb. 19, 2014 (JP) .................. 2014-029926

(51) Int. Cl.
*G02B 15/16* (2006.01)
*G02B 15/14* (2006.01)
(Continued)

(52) U.S. Cl.
CPC ............ *G02B 15/16* (2013.01); *G02B 15/14* (2013.01); *G02B 23/16* (2013.01); *G02B 27/0025* (2013.01)

(58) Field of Classification Search
CPC ........ G02B 15/16; G02B 15/14; G02B 23/16; G02B 27/0025
(Continued)

(56) References Cited

U.S. PATENT DOCUMENTS 4,218,111 A * 8/1980 Withrington ........... G02B 13/00
345/7
5,959,772 A * 9/1999 Yonezawa ............ G02B 21/025
359/434
(Continued)

FOREIGN PATENT DOCUMENTS

EP 2 184 633 A1 5/2010
JP H09-274137 A 10/1997
JP 2007-199336 A 8/2007

OTHER PUBLICATIONS

Extended European Search Report dated Aug. 24, 2017, in European Patent Application No. 15751897.8.
(Continued)

*Primary Examiner* — James Greece
(74) *Attorney, Agent, or Firm* — Shapiro, Gabor and Rosenberger, PLLC

(57) ABSTRACT

A variable-power optical system includes, in order from an object, an objective optical system (O), a relay optical system (R), and an eyepiece optical system (E), wherein the relay optical system is provided with, in order from the object, a first lens group (G1) having positive refractive power, a second lens group (G2) having positive refractive power, and a third lens group (G3) having positive refractive power, and is an optical system in which an image formed by the objective optical system with variable optical power, and the variable-power optical system is configured so as to satisfy expressions: $0.7 < |\beta|_{min} < 1.4$, and $12 \text{ (mm)} < f_{min} < 15 \text{ (mm)}$, where $|\beta|_{min}$ denotes a minimum of absolute value of imaging magnification of the relay optical system, and $f_{min}$ denotes a shortest focal length.

14 Claims, 16 Drawing Sheets

(51) Int. Cl.
*G02B 23/16* (2006.01)
*G02B 27/00* (2006.01)

(58) Field of Classification Search
USPC .......................................................... 359/694
See application file for complete search history.

(56) References Cited

U.S. PATENT DOCUMENTS

2004/0066547 A1* 4/2004 Parker ...................... G02B 5/32
    359/15
2012/0307036 A1 12/2012 Yamamoto

OTHER PUBLICATIONS

International Search Report from International Patent Application No. PCT/JP2015/000788, dated May 19, 2015.
Written Opinion of the International Searching Authority from International Patent Application No. PCT/JP2015/000788, dated May 19, 2015.

* cited by examiner

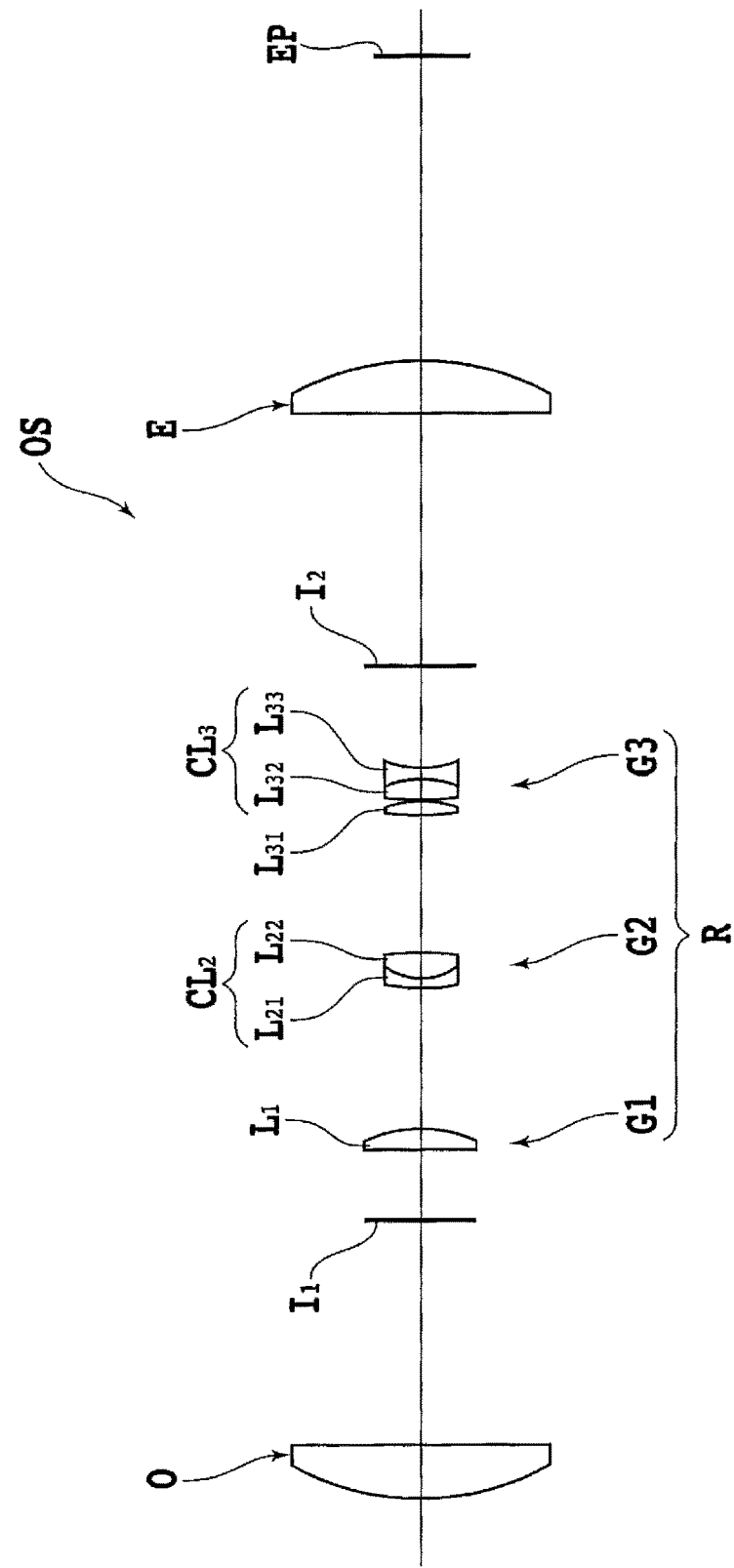

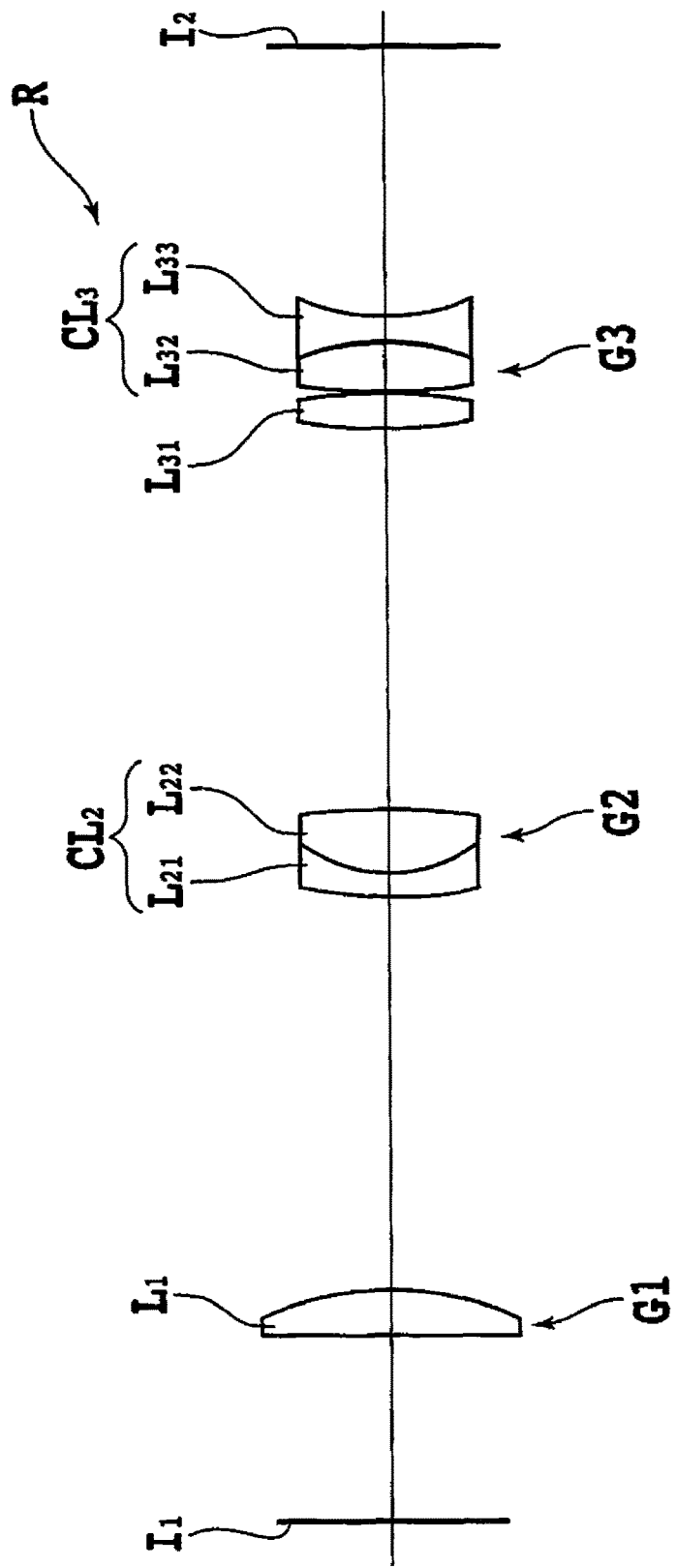

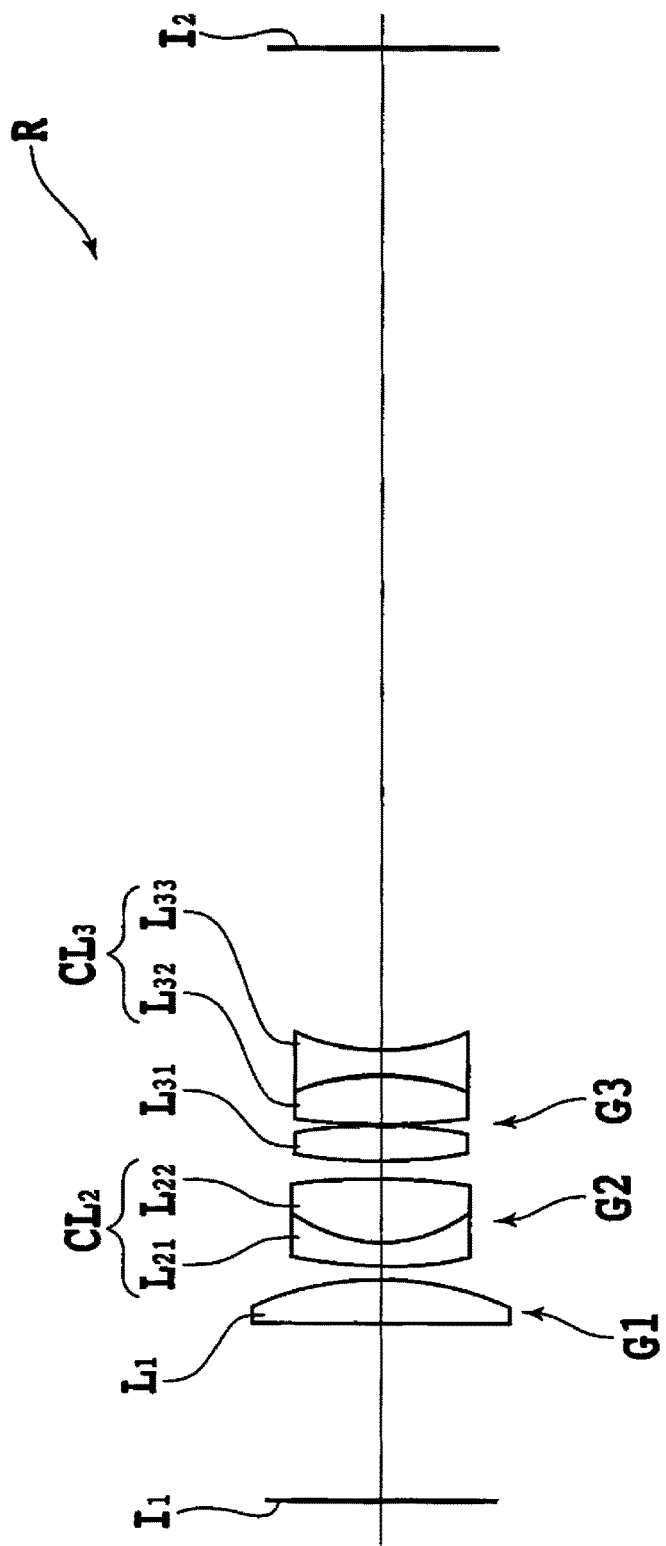

VARIABLE-POWER OPTICAL SYSTEM

This is a continuation of PCT International Application No. PCT/JP2015/000788, filed on Feb. 19, 2015, which is hereby incorporated by reference. This application also claims the benefit of Japanese Patent Application No. 2014-029926, filed in Japan on Feb. 19, 2014, which is hereby incorporated by reference.

TECHNICAL FIELD

The present invention relates to a variable power (zoom) optical system provided with a plurality of movable lens groups.

TECHNICAL BACKGROUND

A telescopic optical system including, in order from an object to be observed, an objective optical system, a relay optical system, and an eyepiece optical system is known. In this telescopic optical system, the relay optical system is provided with a plurality of movable lens groups, for example, and configured so as to vary magnification of the whole telescopic optical system by relatively moving each lens group and changing a focal length (composite focal length) (for example, see Patent Document 1).

In the telescopic optical system provided with such a zoom function (hereinafter, referred to as a variable-power optical system), a first intermediate image to be imaged in the objective optical system is reimaged as a second intermediate image by the relay optical system mentioned above, and further magnified by the eyepiece optical system. Here, positions of two image surfaces on which the first intermediate image and the second intermediate image are formed do not change, and therefore if a reticle is arranged on at least one of the two image surfaces, the variable-power optical system can be utilized as a collimation optical system.

PRIOR ARTS LIST

Patent Document

Patent Document 1: Japanese Laid-Open Patent Publication No. 2007-199336 (A)

SUMMARY OF THE INVENTION

Problem to be Solved by the Invention

Incidentally, in order to obtain a large zoom ratio (variable-power ratio) in the variable-power optical system mentioned above, for example, a moving amount (moving distance) of a lens group included in a relay optical system only needs to be designed in a somewhat large size. However, if the moving amount of the lens group is increased, the lens groups are easily interfered with each other, particularly in a high magnification end state in which a focal length becomes short. Therefore, a zoom ratio of such a variable-power optical system has been so far restricted to a level less than 4 times.

In view of such a problem, the present invention has been made, and an object of the present invention is to provide a variable-power optical system in which a large zoom ratio is realized without increasing the focal length of the relay optical system.

Means to Solve the Problem

According to the present invention, a variable-power optical system is provided in which the variable-power optical system includes, in order from an object, an objective optical system, a relay optical system, and an eyepiece optical system The relay optical system is provided with, in order from the object, a first lens group having positive refractive power, a second lens group having positive refractive power, and a third lens group having positive refractive power, and is an optical system in which an image formed by the objective optical system with variable optical power, and the variable-power optical system satisfies the following conditional expressions (1) and (2):

$$0.7 < |\beta|_{min} < 1.4 \quad (1)$$

$$12 \text{ (mm)} < f_{min} < 15 \text{ (mm)} \quad (2)$$

where $|\beta|_{min}$ denotes a minimum of absolute value of imaging magnification of the relay optical system, and $f_{min}$ denotes a shortest focal length.

In the present invention, the variable-power optical system preferably satisfies the following conditional expressions (3) and (4):

$$0.8 < |\beta|_{min} < 1.3 \quad (3)$$

$$12.5 \text{ (mm)} < f_{min} < 14.5 \text{ (mm)} \quad (4)$$

In the present invention, the variable-power optical system preferably satisfies the following conditional expressions (5) and (6):

$$0.2 < f_{min}/f_1 < 0.4 \quad (5)$$

$$0.7 < f_2/f_3 < 1.0 \quad (6)$$

where $f_1$ denotes a focal length of the first lens group, $f_2$ denotes a focal length of the second lens group, and $f_3$ denotes a focal length of the third lens group.

In the present invention, the third lens group preferably includes, in order from the object, a convex single lens, and a cemented lens which is configured by a convex lens and a concave lens and has negative refractive power.

In the present invention, the variable-power optical system preferably satisfies the following conditional expressions (7) and (8):

$$1.6 < n_{31} < 1.8 \quad (7)$$

$$50 < \nu_{31} \quad (8)$$

where $n_{31}$ denotes a refractive index of the convex single lens arranged on the object, and $\nu_{31}$ denotes the Abbe number.

In the present invention, in the relay optical system, the imaging magnification of the relay optical system is preferably varied by moving the second lens group and the third lens group.

In the present invention, the relay optical system preferably has a support part for supporting the first lens group in a predetermined position relative to the objective optical system.

In the present invention, the system is preferably provided with a tilt mechanism for tilting the relay optical system.

Advantageous Effects of the Invention

According to the present invention, a variable-power optical system can be provided in which a large zoom ratio is realized without increasing a focal length of a relay optical system.

BRIEF DESCRIPTION OF THE DRAWINGS

FIG. 1 is an arrangement drawing showing a lens arrangement of a variable-power optical system according the present embodiment.

FIG. 2A is an arrangement drawing showing a lens arrangement of a relay optical system at minimum magnification, FIG. 2C is an arrangement drawing showing a lens arrangement of the relay optical system at maximum magnification.

DESCRIPTION OF THE EMBODIMENTS

Figure 2B:
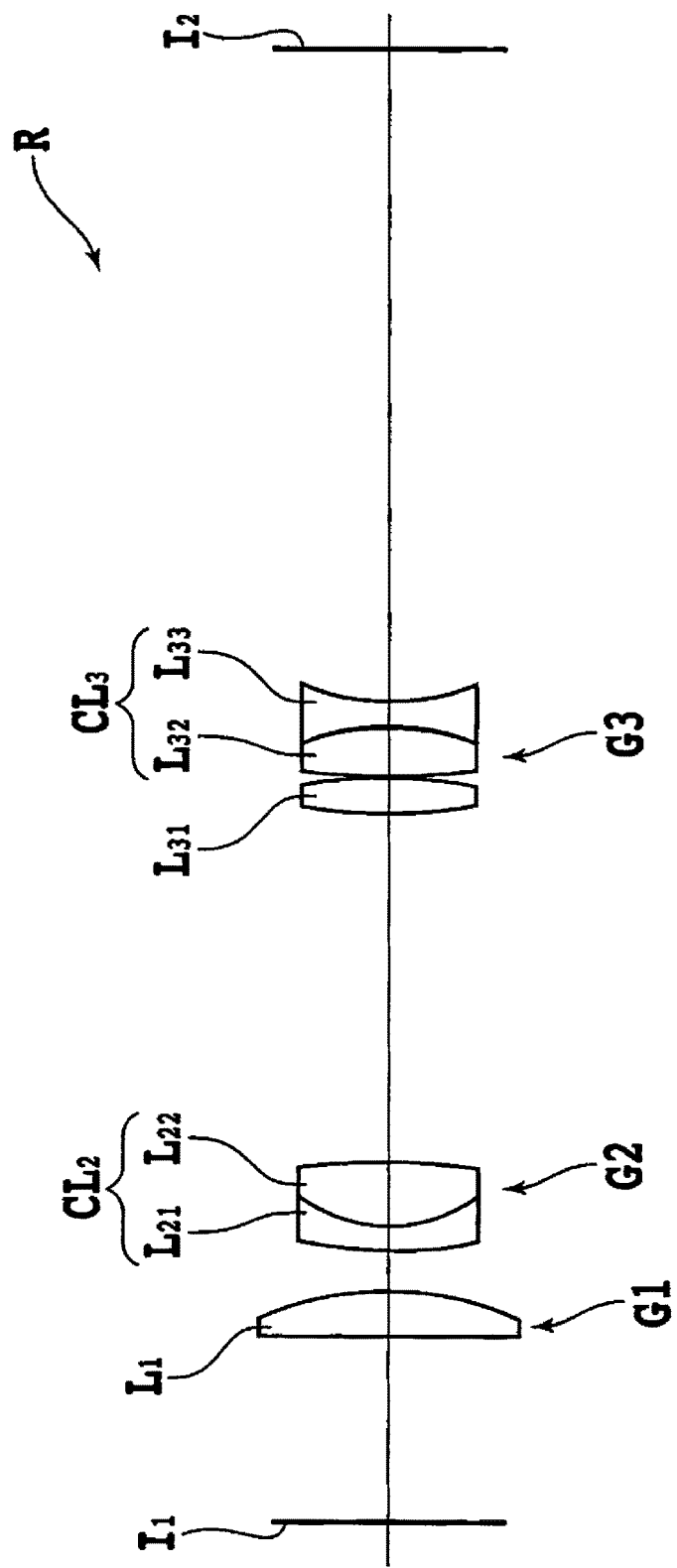
FIG. 2B is an arrangement drawing showing a lens arrangement of the relay optical system at intermediate magnification.

Hereinafter, embodiments of the present invention will be described with reference to accompanying drawings. FIG. 1 is an arrangement drawing showing a lens arrangement of a variable-power optical system according to the present embodiment. As shown in FIG. 1, a variable-power optical system OS of the present embodiment includes, in order from an object (not shown) to be observed, an objective optical system O, a relay optical system R, and an eyepiece optical system E.

The objective optical system O has positive refractive power, and for example, collects light from the object arranged in a remote place to form a first intermediate image (primary image) as an inverted image on a first image surface $I_1$ on a relay optical system R side. In addition, the objective optical system O configured by a plano-convex lens is illustrated in the present embodiment, but a lens configuration of the objective optical system O is not limited thereto.

The relay optical system R is provided with, in order from the object, a field lens group (first lens group) G1 having positive refractive power, a compensator lens group (second lens group) G2 having positive refractive power, and a variator lens group (third lens group) G3 having positive refractive power. This relay optical system R has the positive refractive power as a whole, in which the first intermediate image formed by the objective optical system O is reimaged to form a second intermediate image (secondary image) as an erect image on a second image surface $I_2$ on an eyepiece optical system E side.

The relay optical system R is provided with, for example, a support part (not shown) for supporting the field lens group G1 in a predetermined position relative to the objective optical system O, and the field lens group G1 is fixed on an optical axis by this support part. On the other hand, the compensator lens group G2 and the variator lens group G3 are each movable relative to the field lens group G1. Specifically, the compensator lens group G2 and the variator lens group G3 move along the optical axis so as cause no change in a position of the second image surface $I_2$ on which the second intermediate image is formed. Thus, one lens group of the plurality of lens groups which configures the relay optical system R is fixed, and simultaneously two lens groups are movable in the present embodiment.

Magnification for magnifying (or reducing) the first intermediate image can be varied (zoomed) by moving the compensator lens group G2 and the variator lens group G3 relative to the field lens group G1, and changing the focal length (composite focal length) of the relay optical system R. That is, a zoom function of the variable-power optical system OS is realized by this relay optical system R. Details of the field lens group G1, the compensator lens group G2, and the variator lens group G3 will be described later.

The eyepiece optical system E has the positive refractive power as a whole, in which the second intermediate image formed by the relay optical system R is magnified. In addition, although the eyepiece optical system E configured by the plano-convex lens is illustrated in the present embodiment, a lens configuration of the eyepiece optical system E is not limited thereto. The variable-power optical system OS is configured in this way. Thus, an observer (not shown) can observe the magnified object to be observed at an eye point EP.

When this variable-power optical system OS is used as a collimation optical system, a reticle serving as a collimation system is arranged on at least one (or both are allowed) of the first image surface $I_1$ on which the first intermediate image is formed and the second image surface $I_2$ on which the second intermediate image is formed. The reticle is ordinarily cross hairs or the like prepared by chromium being vapor-deposited on a glass plate, but a variable reticle may be realized by using a liquid crystal panel or the like.

When the variable-power optical system OS is used as a riflescope, a tilt mechanism (impact correction mechanism) for correcting an impact position or the like can also be provided. According to the tilt mechanism, the relay optical system R is tilted relative to the objective optical system O and the eyepiece optical system E to change a direction of observation by the observer. An arrival position of a projectile within a field of view, which position fluctuates depending on a distance, a direction of wind, and the like, can be corrected by this tilt mechanism.

Next, a configuration of the relay optical system R will be described in more detail. As mentioned above, the relay optical system R is provided with the field lens group G1, the compensator lens group G2, and the variator lens group G3. The field lens group G1 is configured by the plano-convex lens (convex lens, convex single lens) $L_1$ which has a flat surface facing the object and has the positive refractive power, and is arranged in neighborhood with the first image surface $I_1$ on which the first intermediate image is formed.

Light from the object, the light passing through the objective optical system O, is incident on the compensator lens group G2 and the variator lens group G3 through the field lens group G1. The compensator lens group G2 is configured by a doublet (cemented lens) $CL_2$ which is formed by cementing a biconvex lens (convex lens) $L_{22}$ to a concave plane of a concave meniscus lens (concave lens) $L_{21}$ having a convex surface facing the object and has the positive refractive power. This compensator lens group G2 moves nonlinearly according to the variator lens group G3 so as to cause no change of the position of the second image surface $I_2$ on which the second intermediate image is formed.

In addition, although the compensator lens group G2 having, in order from the object, the concave lens and the convex lens arranged therein is adopted in FIG. 1, a configuration of the compensator lens group G2 is not limited thereto. For example, a compensator lens group G2 having, in order from the object, the convex lens and the concave lens arranged therein may be adopted.

The variator lens group G3 is configured by, in order from the object, a biconvex lens (convex lens, convex single lens) $L_{31}$, and a doublet (cemented lens) $CL_3$ which is formed by cementing a biconcave lens (concave lens) $L_{33}$ to a biconvex lens (convex lens) $L_{32}$ and has negative refractive power. The doublet $CL_3$ is slightly separated from the biconvex lens $L_{31}$ and arranged therein.

If the variator lens group G3 is configured as mentioned above, a principle point (principle point on the object) of the variator lens group G3 can be formed on the object with respect to the biconvex lens $L_{31}$. As a result, the magnification in a high magnification end state can be sufficiently increased by allowing the compensator lens group G2 and the variator lens group G3 to optically come close to each other without causing interference therebetween. That is, a large zoom ratio can be obtained.

Moreover, if, in order from the object, the lens having positive refractive power (here, the biconvex lens $L_{31}$) and the lens having negative refractive power (here, the doublet $CL_3$) are arranged therein, an exit pupil can be moved closer to the second image surface $I_2$ on which the second intermediate image is formed. As a result, an incident angle at which a flux of light is incident on the eyepiece optical system E is expanded, and therefore an eye relief can be made long. Here, the eye relief refers to a distance from a surface on an eye point EP side of the eyepiece optical system E to the eye point EP.

FIG. 2A is an arrangement drawing showing a lens arrangement of the relay optical system R at minimum magnification, FIG. 2B is an arrangement drawing showing a lens arrangement of the relay optical system R at intermediate magnification, and FIG. 2C is an arrangement drawing showing a lens arrangement of the relay optical system R at maximum magnification. As shown in FIG. 2A, if the compensator lens group G2 and the variator lens group G3 are separated from the field lens group G1 at a maximum, the focal length of the relay optical system R becomes longest. That is, the refractive power of the relay optical system R becomes weakest, and the variable-power optical system OS results in the minimum magnification.

Moreover, as shown in FIG. 2B, if the compensator lens group G2 and the variator lens group G3 are moved closer to the field lens group G1 with respect to a state in FIG. 2A, the focal length of the relay optical system R becomes shorter than the focal length at the minimum magnification. As a result, the refractive power of the relay optical system R becomes strong, and the magnification of the variable-power optical system OS becomes higher (intermediate magnification) than the minimum magnification.

Further, as shown in FIG. 2C, if the compensator lens group G2 and the variator lens group G3 are moved closer to the field lens group G1 at a maximum, the focal length of the relay optical system R becomes shortest. That is, the refractive power of the relay optical system R becomes strongest, and the magnification of the variable-power optical system OS results in the maximum magnification.

Thus, the magnification of the variable-power optical system OS can be varied by moving the compensator lens group G2 and the variator lens group G3 relative to the field lens group G1, and changing the focal length of the relay optical system R. In addition, as is seen from FIGS. 2A to 2C, a moving amount of the compensator lens group G2 is non-linear relative to a moving amount of the variator lens group G3.

This relay optical system R is configured so as to satisfy the conditional expressions (1) and (2) described below in order to realize a large zoom ratio, a wide field of view, and a short total length. In addition, $|\beta|_{min}$ represents a minimum of absolute value of the imaging magnification of the relay optical system R (that is, the magnification in a low magnification end state), and $f_{min}$ represents a shortest focal length of the relay optical system R (that is, a focal length in the high magnification end state).

$$0.7 < |\beta|_{min} < 1.4 \quad (1)$$

$$12\ (mm) < f_{min} < 15\ (mm) \quad (2)$$

In order to increase the zoom ratio in the relay optical system R, it is necessary to realize sufficiently high magnification in the high magnification end state. If an increase in the magnification in the high magnification end state is tried, it is obviously necessary to decrease the focal length of the relay optical system R. Therefore, the compensator lens group G2 and the variator lens group G3 are arranged closely to the field lens group G1.

At this time, if the magnification (that is, $|\beta|_{min}$) of the relay optical system R in the low magnification end state is made excessively large, the magnification in the high magnification end state becomes excessively large, and the lens groups of the relay optical system R become easy to interfere with each other. Moreover, the aberration remaining in the first intermediate image is excessively expanded, and therefore the aberration in the high magnification end state is deteriorated. Thus, in the present embodiment, the relay optical system R is configured so as to satisfy the expressions: $|\beta|_{min} < 1.4$, and preferably $|\beta|_{min} < 1.3$ to prevent the magnification of the relay optical system R in the low magnification end state from becoming excessively large.

On the other hand, a size of the first intermediate image to be observed by the observer is provided by dividing a size of the second intermediate image by the magnification of the relay optical system R. That is, the size of the first intermediate image becomes maximum in the low magnification end state in which the magnification of the relay optical system R becomes minimum. Therefore, if the magnification of the relay optical system R in the low magnification end state is made excessively low, the first intermediate image relative becomes excessively large relative to the second intermediate image. In addition, the size of the second intermediate image to be observed by the observer is determined by the focal length of the eyepiece optical system E and an apparent field of view, independently of the magnification of the relay optical system R.

The sizes of the first intermediate image and the second intermediate image are restricted by a diameter of a lens-barrel which configures the relay optical system R (or the variable-power optical system OS). Therefore, if the first intermediate image becomes excessively large relative to the second intermediate image, the flux of light which forms the first intermediate image interferes with the lens-barrel, and the field of view is restricted. Thus, in the present embodiment, the relay optical system R is configured so as to satisfy the expressions: $0.7<|\beta|_{min}$, and preferably, $0.8<|\beta|_{min}$ to prevent the magnification of the relay optical system R in the low magnification end state from becoming excessively small.

Moreover, if the focal length of the relay optical system R is made excessively long, a total optical length (distance from the first image surface $I_1$ to the second image surface $I_2$) of the relay optical system R also becomes long, and the exit pupil viewed from the second intermediate image to be imaged in the relay optical system R becomes remote. As a result, the flux of light with a large angle of view is easily eclipsed, and the field of view of the variable-power optical system OS is restricted. Further, the incident angle at which the flux of light is incident on the eyepiece optical system becomes small, and therefore the eye relief also becomes insufficient. Thus, in the present embodiment, the relay optical system R is configured so as to satisfy the expressions: $f_{min}<15$ (mm), and preferably $f_{min}<14.5$ (mm) to prevent the focal length of the relay optical system R from becoming excessively long.

On the contrary, if the focal length of the relay optical system R is made excessively short, intervals between the field lens group G1, and the compensator lens group G2, and between the compensator lens group G2, and the variator lens group G3 become narrow, and the lens groups become easy to interfere with each other in the high magnification end state. Thus, in the present embodiment, the relay optical system R is configured so as to satisfy the expressions: 12 (mm)$<f_{min}$, and preferably 12.5 (mm)$<f_{min}$ to prevent the focal length of the relay optical system R from becoming excessively short.

In summary, the relay optical system R is configured so as to satisfy the conditional expressions (1) and (2) described above and preferably the conditional expressions (3) and (4) described below. In addition, if the relay optical system R is configured so as to satisfy the conditional expressions (3) and (4), while the aberration is further improved, the wide field of view can be obtained.

$$0.8<|\beta|_{min}<1.3 \quad (3)$$

$$12.5 \text{ (mm)}<f_{min}<14.5 \text{ (mm)} \quad (4)$$

Moreover, the relay optical system R preferably satisfies the conditional expressions (5) and (6) described below. In addition, $f_1$ represents a focal length of the field lens group G1, $f_2$ represents a focal length of the compensator lens group G2, and $f_3$ represents a focal length of the variator lens group G3.

$$0.2<f_{min}/f_1<0.4 \quad (5)$$

$$0.7<f_2/f_3<1.0 \quad (6)$$

For example, if the refractive power of the field lens group G1 is excessively strong, an incident height at which an off-axis flux of light is incident on the compensator lens group G2 and the variator lens group G3 in the low magnification end state becomes high, and a fluctuation of an off-axis aberration in association with variable-power becomes large. Thus, in the present embodiment, the relay optical system R is configured so as to satisfy the expressions $f_{min}/f_1<0.4$, and preferably $f_{min}/f_1<0.35$ to prevent the refractive power of the field lens group G1 from becoming excessively strong.

On the contrary, if the refractive power of the field lens group G1 is excessively weak, it becomes necessary to allow the compensator lens group G2 and the variator lens group G3 to come closer to each other to compensate the magnification in the high magnification end state, and the lens groups become easy to interfere with each other. Thus, in the present embodiment, the relay optical system R is configured so as to satisfy the expressions: $0.2<f_{min}/f_1$, and preferably $0.25<f_{min}/f_1$ to prevent the refractive power of the field lens group G1 from becoming excessively weak.

Moreover, if the refractive power of the variator lens group G3 becomes excessively large relative to the refractive power of the compensator lens group G2, the exit pupil viewed from the second intermediate image becomes remote, and the eye relief becomes insufficient at every magnification. Thus, in the present embodiment, the relay optical system R is configured so as to satisfy the expressions: $f_2/f_3<1.0$, and preferably $f_2/f_3<0.95$ to prevent the refractive power of the variator lens group G3 from becoming excessively large relative to the refractive power of the compensator lens group G2.

On the other hand, if the refractive power of the compensator lens group G2 becomes excessively large relative to the refractive power of the variator lens group G3, an incident height at which the off-axis flux of light is incident on the variator lens group G3 in the low magnification end state becomes high, and the fluctuation of the off-axis aberration in association with the variable-power becomes large. Moreover, the off-axis flux of light is easily eclipsed in the variator lens group G3, and the apparent field of view becomes small. Thus, in the present embodiment, the relay optical system R is configured so as to satisfy the expressions: $0.7<f_2/f_3$, and preferably $0.8<f_2/f_3$ to prevent the refractive power of the compensator lens group G2 from becoming excessively large relative to the refractive power of the variator lens group G3.

That is, the relay optical system R preferably satisfies the conditional expressions (5) and (6) described above, and further preferably satisfies the conditional expressions (5') and (6') described below.

$$0.25<f_{min}/f_1<0.35 \quad (5')$$

$$0.8<f_2/f_3<0.95 \quad (6')$$

Further, the relay optical system R preferably satisfies the conditional expressions (7) and (8) described below, in which $n_{31}$ denotes a refractive index of a biconvex lens (convex single lens) $L_{31}$ which configures the variator lens group G3, and $v_{31}$ denotes the Abbe number.

$$1.6<n_{31}<1.8 \quad (7)$$

$$50<v_{31} \quad (8)$$

Although a high zoom ratio is obtained in the relay optical system R according to the present embodiment, a fluctuation of a lateral chromatic aberration easily becomes large as caused by asymmetry between the compensator lens group G2 and the variator lens group G3. In the biconvex lens $L_{31}$ arranged on the object in the variator lens group G3, angles and heights at which a principle ray passes therethrough are significantly different between the low magnification end state and the high magnification end state, and therefore action of the Abbe number on the lateral chromatic aberration is inversely generated.

If the Abbe number $v_{31}$ of the biconvex lens $L_{31}$ becomes excessively small, the fluctuation of the lateral chromatic aberration that cannot be completely corrected with other lenses is generated. Thus, in the present embodiment, the relay optical system R is configured so as to satisfy the expression: $50 < v_{31}$ to prevent the Abbe number $v_{31}$ of the biconvex lens $L_{31}$ from becoming excessively small.

Moreover, if the refractive index $n_{31}$ of the biconvex lens $L_{31}$ is made large to some extent, the principle point of the variator lens group G3 can be moved closer to the object. Thus, in the present embodiment, the relay optical system R is configured so as to satisfy the expression: $1.6 < n_{31}$ to arrange the refractive index $n_{31}$ of the biconvex lens $L_{31}$ to become large to some extent.

Moreover, although a distance from a vertex of a lens $L_1$ of the field lens group G1 on an objective optical system side to a vertex of a lens $L_{33}$ of the variator lens group G3 on an eyepiece optical system side varies depending on movement of the lens group, a minimum value $D_{min}$ is preferably 38 mm or less. Furthermore, $D_{min}$ is further preferably 20 mm or less in the high magnification state of the relay optical system R.

In the variable-power optical system OS, the large zoom ratio can be obtained, while a favorable aberration is maintained, by configuring the relay optical system R as mentioned above. However, the minimum value $D_{min}$ of the relay optical system R has an arbitrary property to some extent.

That is, $D_{min}$ is a value influenced by a thickness and an edge thickness of the lenses which configure the relay optical system R, a lens-barrel design, and the like. In the lens-barrel design, a configurable minimum lens interval is determined by interference between lens holders in each group, accuracy of a cam in a moving lens group, and the like.

On the other hand, from an optical viewpoint, it is further preferable to set the focal length in each group within the range of the conditions mentioned above to reduce the lens interval in view of increasing relay magnification while a size of the relay optical system is reduced.

Thus, the relay optical system R according to the present embodiment is configured without using a so-called Barlow lens with which the focal length of the optical system can be made long, and therefore a size of the variable-power optical system OS can be sufficiently reduced.

Moreover, the large zoom ratio (for example, the zoom ratio exceeding 4 times) can be realized without increasing the focal length of the relay optical system R by configuring the variable-power optical system OS as mentioned above. In this variable-power optical system OS, various aberrations can be favorably corrected while a sufficient field of view and a sufficient eye relief are ensured in the entire zoom range. Therefore, the variable-power optical system OS is used in the collimation optical system such as a finder of an astrometric telescope and the riflescope.

That is, in the variable-power optical system OS according to the present embodiment, the large zoom ratio can be realized without increasing the focal length of the relay optical system R, and therefore the exit pupil viewed from the second intermediate image to be imaged in the relay optical system R can be prevented from becoming remote, which serves as an advantage also in an application in which the diameter of the relay optical system R cannot be increased.

For example, in the collimation optical system such as the riflescope, a diameter of an outer tube in which the relay optical system R is housed is determined according to a standard and the like, and cannot be easily varied. Moreover, when the tilt mechanism (impact correction mechanism) for tilting the relay optical system in order to correct the impact position is mounted, a space for tilting the relay optical system relative to the outer tube is required. That is, the diameter of the lens-barrel in the relay optical system R should be designed to be sufficiently smaller than the diameter of the outer tube.

Also in such an application, the exit pupil viewed from the second intermediate image to be imaged in the relay optical system R does not become remote, and therefore the field of view of the variable-power optical system OS can be kept wide by suppressing eclipse of ray of light with the large angle of view. Moreover, the incident angle at which the ray of light is incident on the eyepiece optical system E can also be prevented from becoming small, and insufficiency of the eye relief can be prevented. In addition, the variable-power optical system OS according to the present embodiment may be configured so as to have a zoom ratio of 6 times, 7 times, or 10 times, for example.

EXAMPLES

Next, Examples of the present invention will be described. In addition, as data to be disclosed, parameters common among respective Examples are used.

Example 1

Figure 3:
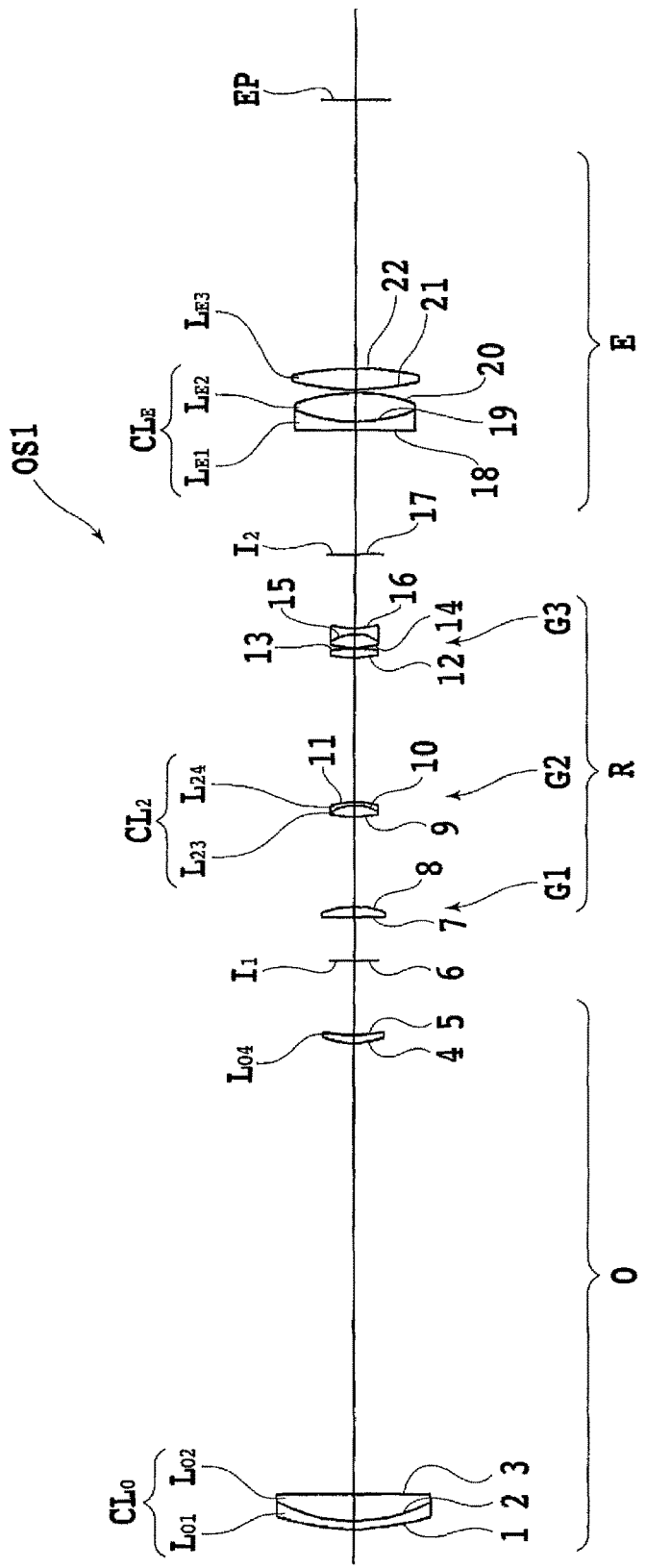
FIG. 3 is an arrangement drawing showing a lens arrangement of a variable-power optical system according to Example 1.

FIG. 3 is an arrangement drawing showing a lens arrangement of a variable-power optical system according to Example 1. An objective optical system O of a variable-power optical system OS1 according to Example 1 is provided with, in order from an object, a doublet (cemented lens) $CL_O$ which is formed by cementing a biconvex lens (convex lens) $L_{O2}$ to a concave surface of a concave meniscus lens (concave lens) $L_{O1}$ having a convex surface facing the object and has positive refractive power, and a convex meniscus lens (convex lens, convex single lens) $L_{O4}$ which has a convex surface facing the object and has positive refractive power. The convex meniscus lens $L_{O4}$ is positioned at a predetermined distance from the doublet $CL_{O1}$.

Moreover, an eyepiece optical system E is provided with, in order from the object, a doublet (cemented lens) $CL_E$ which is formed by cementing a biconvex lens (convex lens) $L_{E2}$ to a biconcave lens (concave lens) $L_{E1}$ and has positive refractive power, and a biconvex lens (convex lens, convex single lens) $L_{E3}$ having positive refractive power. The biconvex lens $L_{E3}$ is slightly separated from the doublet $CL_{E1}$ and arranged therein.

Moreover, a compensator lens group G2 of a relay optical system R is configured by a doublet (cemented lens) $CL_2$ which is formed by cementing a concave surface of a concave meniscus lens (concave lens) $L_{24}$ to a biconvex lens (convex lens) $L_{23}$ arranged on the object and has positive refractive power. Other configurations of the relay optical system R are the same with the configurations of the variable-power optical system OS according to the embodiment mentioned above, and therefore the description thereof will be omitted herein.

Next, various specifications of the variable-power optical system OS1 according to the present Example will be shown. In addition, in <Lens Specifications>, m represents a number (1 to 22, see FIG. 3) of an optical surface placed in order from the object, R represents a radius of curvature (mm) of each optical surface, D represents a distance (mm) on an optical axis from each optical surface to a next optical surface, nd represents a refraction index relative to a d-line (nm), and ν represents the Abbe number. Moreover, values of d1 (mm), d2 (mm), and d3 (mm) in <Lens Specifications> take different values according to magnification of the variable-power optical system OS1 as shown in <Lens Group Interval>. From the various specifications below, it is found that a zoom ratio (5 times) exceeding 4 times is realized without increasing a focal length of the relay optical system R in the variable-power optical system OS1 according to the present Example. In the variable-power optical system OS1 according to the present Example, a significantly large zoom ratio is realized.

<Entire Specifications>

$f_1$ = 45.0 (mm)
$f_2$ = 39.0 (mm)
$f_3$ = 42.0 (mm)
$|\beta|_{min}$ = 1.2
$f_{min}$ = 14.1 (mm)
$f_{min}/f_1$ = 0.31
$f_2/f_3$ = 0.93
$\nu_{31}$ = 53.188
$D_{min}$ = 18.2 (mm)
Magnification: 3.0 to 15.0
Angle of view: 6.4° to 1.28°
Diameter of entrance pupil: 42 (mm) (entire range)

<Lens Specifications>

| m | R | D | nd | ν |
|---|---|---|---|---|
| 1 | 66.000 | 2.5 | 1.80440 | 39.57 |
| 2 | 44.850 | 8.0 | 1.49700 | 81.61 |
| 3 | −4450.000 | 135.0 | | |
| 4 | 21.000 | 2.5 | 1.51680 | 64.12 |
| 5 | 43.000 | 22.35 | | |
| 6 | ∞ | 13.0 | | |
| 7 | ∞ | 3.0 | 1.51680 | 64.12 |
| 8 | −23.256 | d1 | | |
| 9 | 51.860 | 3.5 | 1.51680 | 64.12 |
| 10 | −12.300 | 1.0 | 1.72825 | 28.46 |
| 11 | −22.000 | d2 | | |
| 12 | 35.800 | 2.7 | 1.62230 | 53.19 |
| 13 | −35.800 | 0.2 | | |
| 14 | 35.800 | 4.0 | 1.51680 | 64.12 |
| 15 | −11.600 | 1.8 | 1.58144 | 40.75 |
| 16 | 23.256 | d3 | | |
| 17 | ∞ | 37.0 | | |
| 18 | −531.440 | 2.5 | 1.71736 | 29.52 |
| 19 | 43.000 | 9.0 | 1.51680 | 64.12 |
| 20 | −43.000 | 1.0 | | |
| 21 | 72.000 | 6.4 | 1.51680 | 64.12 |
| 22 | −72.000 | | | |

<Lens Group Interval>

| | Magnification | | |
|---|---|---|---|
| | 3.0 | 7.50 | 15.0 |
| d1 | 26.98 | 1.43 | 1.01 |
| d2 | 43.17 | 30.08 | 0.99 |
| d3 | 22.15 | 60.78 | 90.30 |

Figure 4:
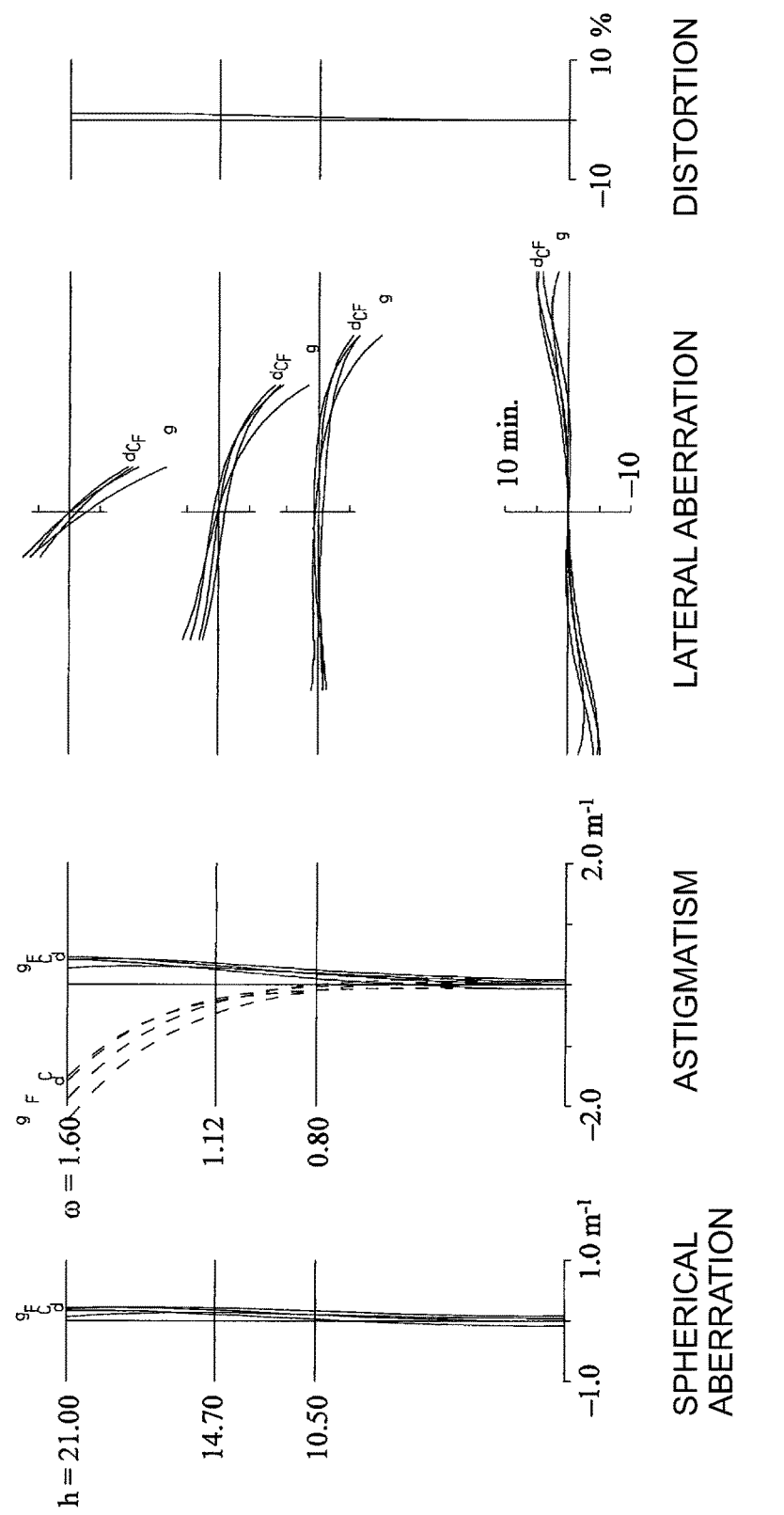
FIG. 4 is graphs showing various aberrations of the variable-power optical system at minimum magnification according to Example 1.
Figure 5:
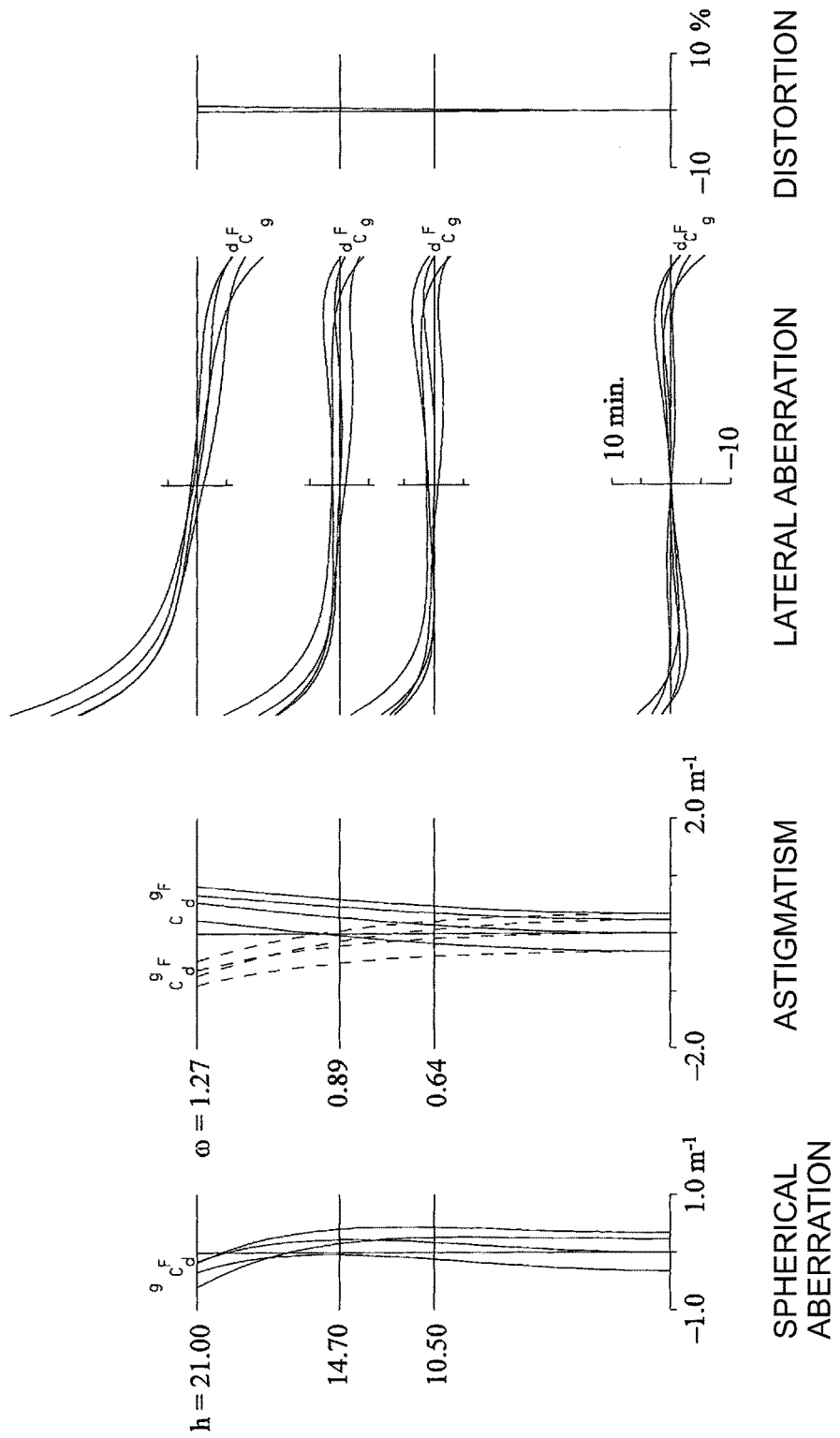
FIG. 5 is graphs showing various aberrations of the variable-power optical system at intermediate magnification according to Example 1.
Figure 6:
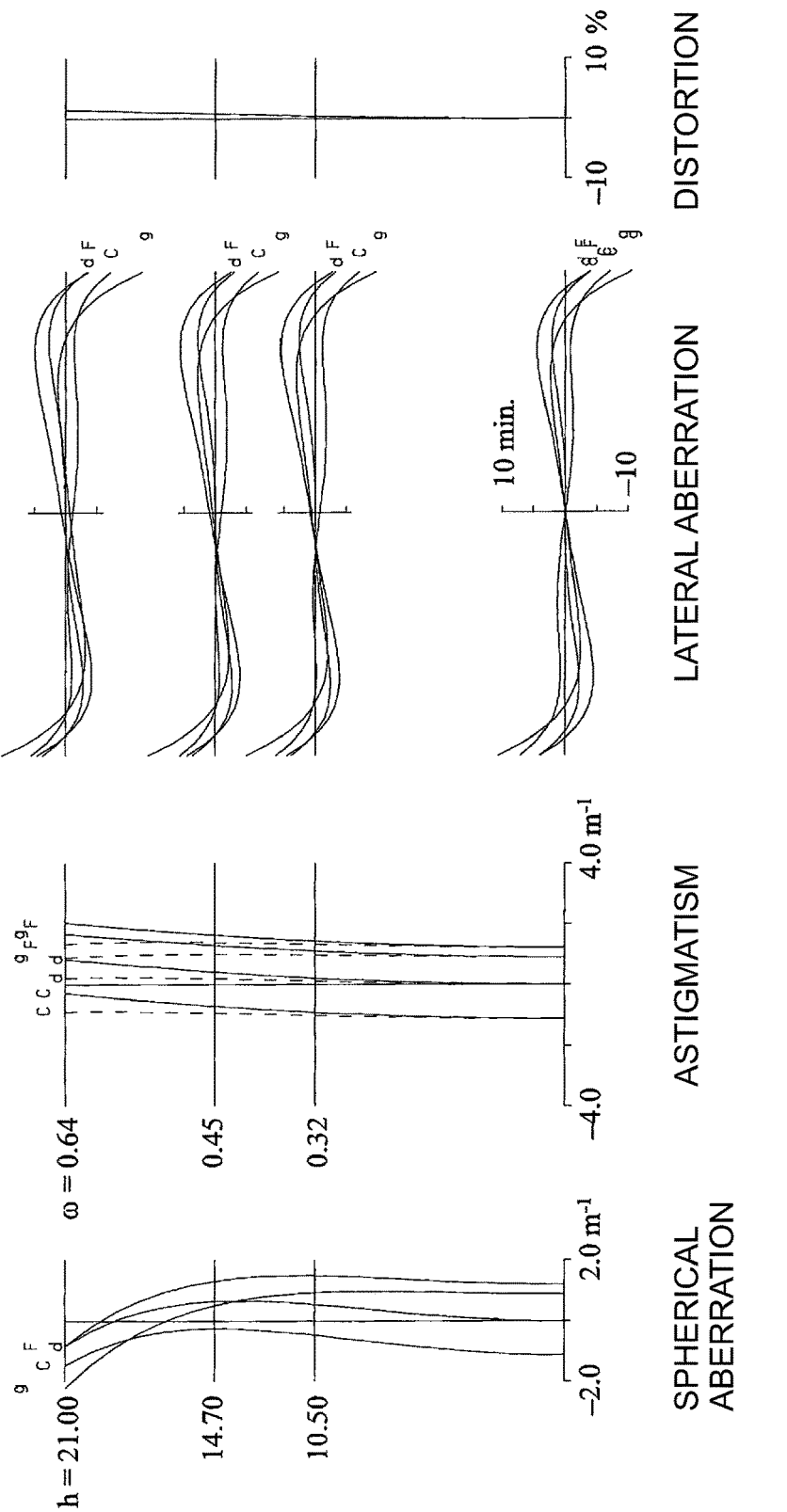
FIG. 6 is graphs showing various aberrations of the variable-power optical system at maximum magnification according to Example 1.

FIG. 4 is graphs showing various aberrations of the variable-power optical system OS1 at minimum magnification according to Example 1, FIG. 5 is graphs showing various aberrations of the variable-power optical system OS1 at intermediate magnification according to Example 1, and FIG. 6 is graphs showing various aberrations of the variable-power optical system OS1 at maximum magnification according to Example 1. Each drawing shows a spherical aberration, astigmatism, a lateral aberration, and distortion for a g-line (436 nm), an F-line (486 nm), a d-line (588 nm), and a C-line (656 nm). In addition, in each drawing, h represents a height from the optical axis, and w represents a half angle of view. From FIGS. 4 to 6, it is found that the variable-power optical system OS1 according to the present Example is provided with favorable aberration characteristics over the entire zoom range.

Example 2

Figure 7:
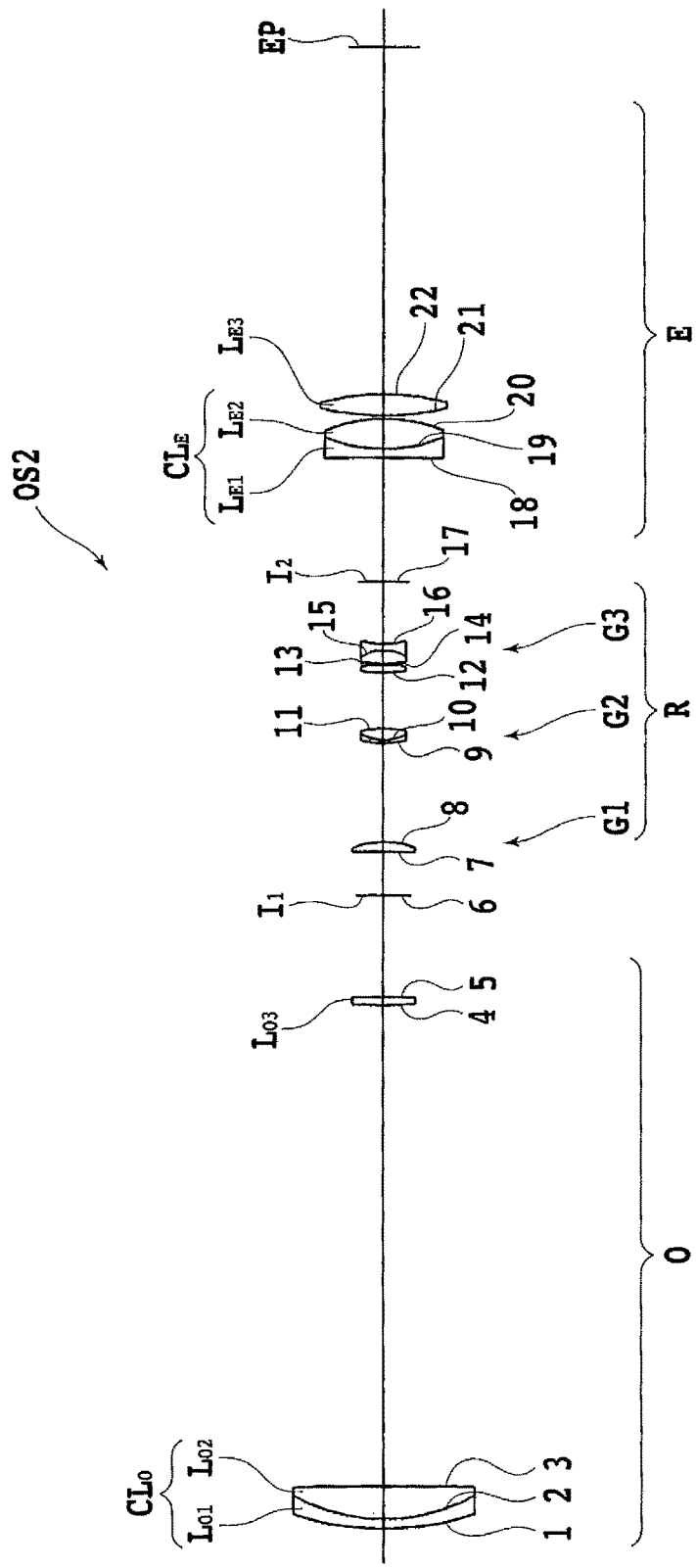
FIG. 7 is an arrangement drawing showing a lens arrangement of a variable-power optical system according to Example 2.

FIG. 7 is an arrangement drawing showing a lens arrangement of a variable-power optical system according to Example 2. An objective optical system O of a variable-power optical system OS2 according to Example 2 is provided with, in order from an object, a doublet (cemented lens) $CL_O$ which is formed by cementing a biconvex lens (convex lens) $L_{O2}$ to a concave surface of a concave meniscus lens (concave lens) $L_{O1}$ having a convex surface facing the object, and a plano-convex lens (convex lens, convex single lens) $L_{O3}$ which has a convex lens facing the object and has positive refractive power. The plano-convex lens $L_{O3}$ is positioned at a predetermined distance from the doublet $CL_{O1}$.

Moreover, an eyepiece optical system E is provided with, in order from the object, a doublet (cemented lens) $CL_E$ which is formed by cementing a biconvex lens (convex les) $L_{E2}$ to a biconcave lens (concave lens) $L_{E1}$ and has positive refractive power, and a biconvex lens (convex lens, convex single lens) $L_{E3}$ having positive refractive power. The biconvex lens $L_{E3}$ is slightly separated from the doublet $CL_{E1}$ and arranged therein. A configuration of the relay optical system R is the same with the configuration of the variable-power optical system OS according to the embodiment mentioned above, and therefore the description thereof will be omitted herein.

Various specifications of the variable-power optical system OS2 according to the present Example are as shown below. From the various specifications below, it is found that a zoom ratio (about 4.89 times) exceeding 4 times is also realized without increasing a focal length of the relay optical system R in the variable-power optical system OS2 according to the present Example. In the variable-power optical system OS2 according to the present Example, a large aperture is realized.

<Entire Specifications>

$f_1$ = 42.6 (mm)
$f_2$ = 35.5 (mm)
$f_3$ = 39.3 (mm)
$|\beta|_{min}$ = 0.91
$f_{min}$ = 13.0 (mm)
$f_{min}/f_1$ = 0.31
$f_2/f_3$ = 0.9
$\nu_{31}$ = 56.169
$D_{min}$ = 18.3 (mm)
Magnification: 3.02 to 14.76
Angle of view: 5.7° to 1.15°
Diameter of entrance pupil: 50 (mm) (entire range)

-continued

<Entire Specifications>

<Lens Specifications>

| m | R | D | nd | ν |
|---|---|---|---|---|
| 1 | 75.000 | 3.0 | 1.80610 | 40.94 |
| 2 | 50.600 | 10.0 | 1.49700 | 81.61 |
| 3 | −1020.000 | 144.0 | | |
| 4 | 99.500 | 2.5 | 1.51680 | 64.12 |
| 5 | ∞ | 30.4 | | |
| 6 | ∞ | 13.0 | | |
| 7 | ∞ | 3.0 | 1.51680 | 64.12 |
| 8 | −22.000 | d1 | | |
| 9 | 23.500 | 1.0 | 1.72825 | 28.46 |
| 10 | 11.720 | 3.5 | 1.51680 | 64.12 |
| 11 | −33.000 | d2 | | |
| 12 | 35.500 | 2.5 | 1.65100 | 56.17 |
| 13 | −35.500 | 0.2 | | |
| 14 | 35.000 | 4.0 | 1.63854 | 55.48 |
| 15 | −11.600 | 2.0 | 1.70154 | 41.17 |
| 16 | 22.870 | d3 | | |
| 17 | ∞ | 37.0 | | |
| 18 | −531.440 | 2.5 | 1.71736 | 29.52 |
| 19 | 43.000 | 9.0 | 1.51680 | 64.12 |
| 20 | −43.000 | 1.0 | | |
| 21 | 72.000 | 6.4 | 1.51680 | 64.12 |
| 22 | −72.000 | | | |

<Lens Group Interval>

| | Magnification | | |
|---|---|---|---|
| | 3.02 | 7.50 | 14.76 |
| d1 | 29.31 | 5.87 | 1.01 |
| d2 | 16.66 | 19.81 | 1.07 |
| d3 | 18.64 | 38.93 | 62.52 |

Figure 8:
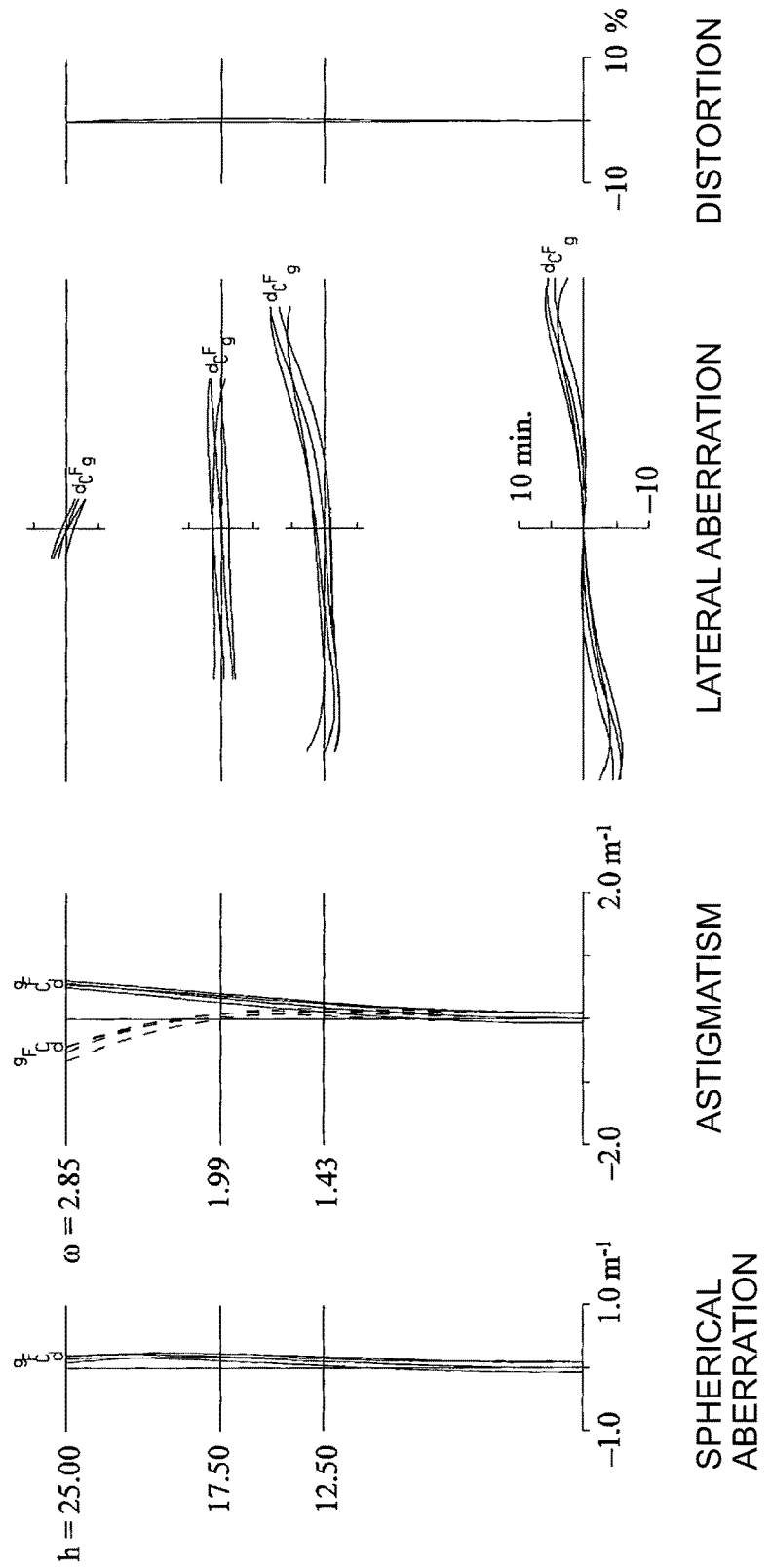
FIG. 8 is graphs showing various aberrations of the variable-power optical system at minimum magnification according to Example 2.
Figure 9:
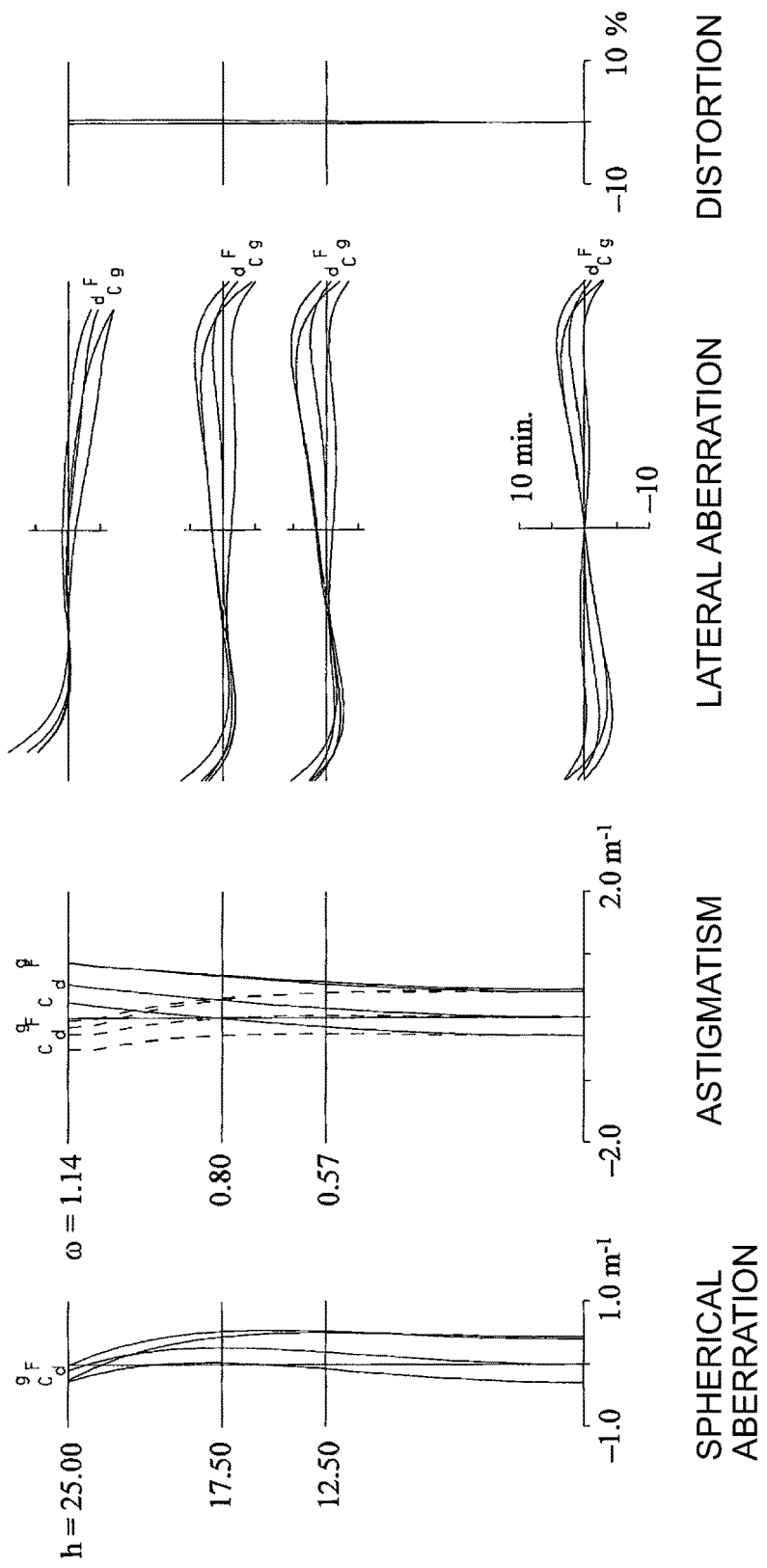
FIG. 9 is graphs showing various aberrations of the variable-power optical system at intermediate magnification according to Example 2.
Figure 10:
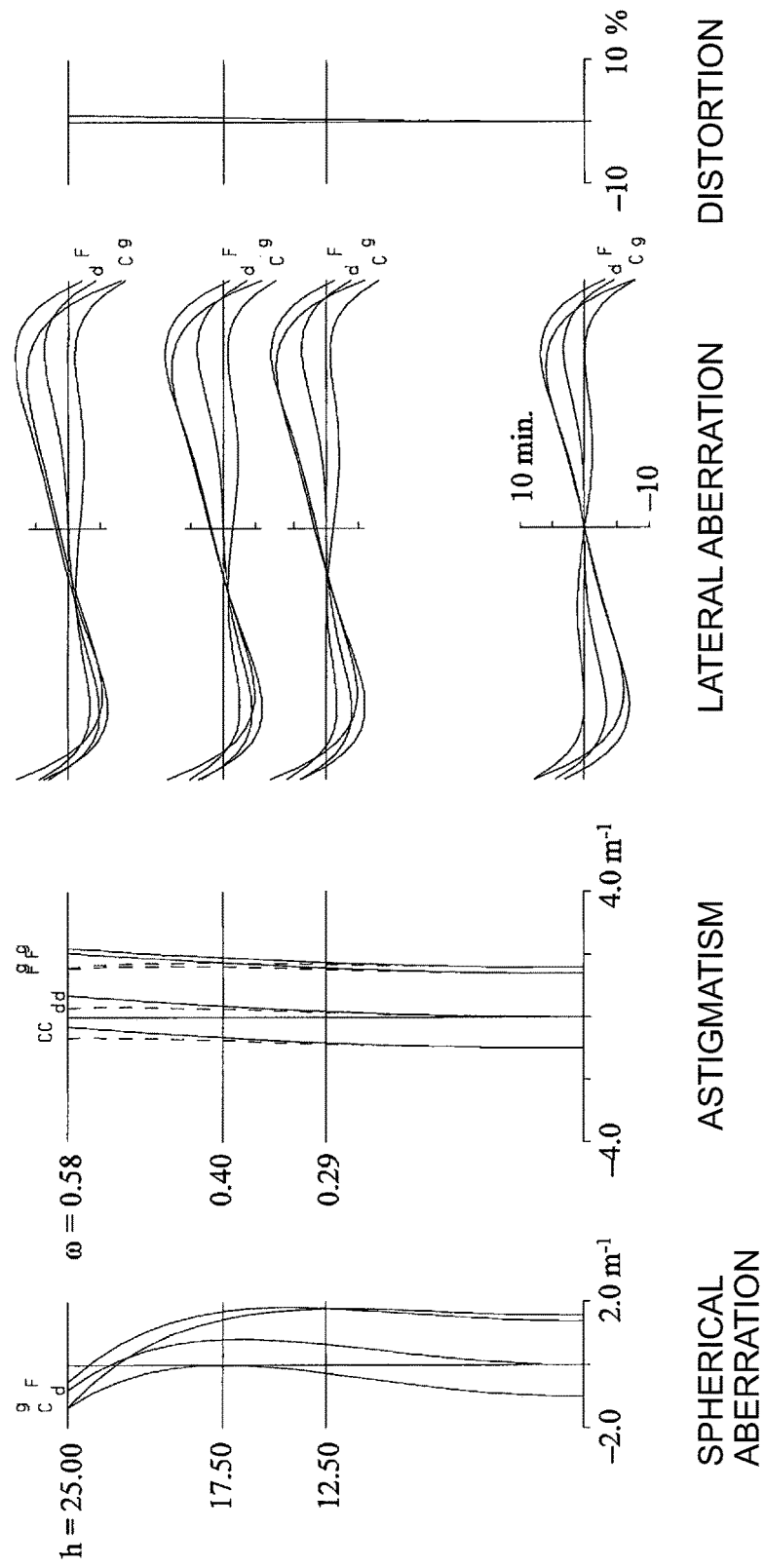
FIG. 10 is graphs showing various aberrations of the variable-power optical system at maximum magnification according to Example 2.

FIG. 8 is graphs showing various aberrations of the variable-power optical system OS2 at minimum magnification according to Example 2, FIG. 9 is graphs showing various aberrations of the variable-power optical system OS2 at intermediate magnification according to Example 2, and FIG. 10 is graphs showing various aberrations of the variable-power optical system OS2 at maximum magnification according to Example 2. From FIGS. 8 to 10, it is found that the variable-power optical system OS2 according to the present Example is also provided with favorable aberration characteristics over the entire zoom range.

Example 3

Figure 11:
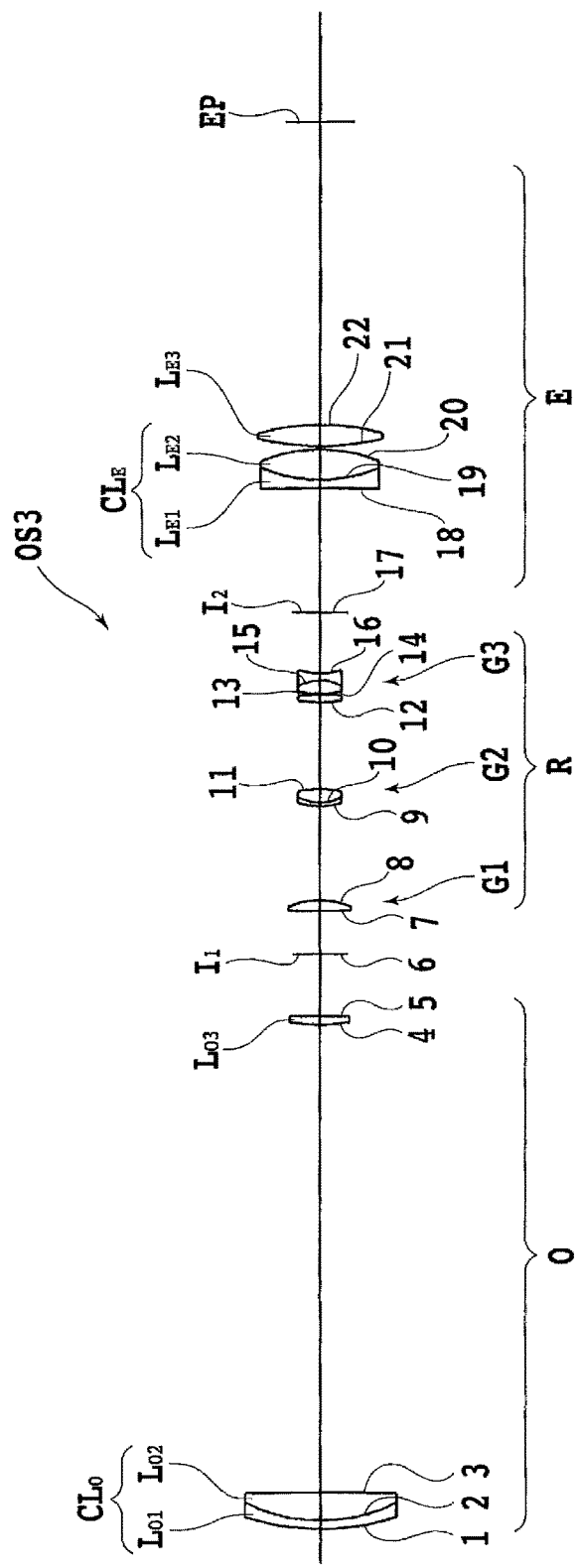
FIG. 11 is an arrangement drawing showing a lens arrangement of a variable-power optical system according to Example 3.

FIG. 11 is an arrangement drawing showing a lens arrangement of a variable-power optical system according to Example 3. As shown in FIG. 11, the lens arrangement of the variable-power optical system OS3 according to Example 3 is similar to the lens arrangement of the variable-power optical system OS2 according to Example 2.

Various specifications of the variable-power optical system OS3 according to the present Example are as shown below. From the various specifications below, it is found that a zoom ratio (about 4.89 times) exceeding 4 times is also realized without increasing a focal length of a relay optical system R in the variable-power optical system OS3 according to the present Example.

<Entire Specifications>

$f_1$ = 44.5 (mm)
$f_2$ = 35.5 (mm)

-continued

<Entire Specifications>

$f_3$ = 40.6 (mm)
$|β|_{min}$ = 1.01
$f_{min}$ = 13.4 (mm)
$f_{min}/f_1$ = 0.30
$f_2/f_3$ = 0.87
$ν_{31}$ = 55.477
$D_{min}$ = 18.8 (mm)
Magnification: 3.02 to 14.76
Angle of view: 6.25° to 1.30°
Diameter of entrance pupil: 42 (mm) (entire range)

<Lens Specifications>

| m | R | D | nd | ν |
|---|---|---|---|---|
| 1 | 69.500 | 2.5 | 1.80610 | 40.94 |
| 2 | 46.550 | 8.5 | 1.49700 | 81.61 |
| 3 | −650.000 | 140.3 | | |
| 4 | 64.000 | 2.5 | 1.51680 | 64.11 |
| 5 | ∞ | 18.8 | | |
| 6 | ∞ | 13.0 | | |
| 7 | ∞ | 3.0 | 1.51680 | 64.11 |
| 8 | −23.000 | d1 | | |
| 9 | 23.000 | 1.0 | 1.71736 | 29.52 |
| 10 | 11.600 | 4.0 | 1.51680 | 64.11 |
| 11 | −35.000 | d2 | | |
| 12 | 35.000 | 2.5 | 1.63854 | 55.48 |
| 13 | −35.000 | 0.2 | | |
| 14 | 35.000 | 4.0 | 1.51680 | 64.11 |
| 15 | −11.600 | 2.0 | 1.58144 | 40.75 |
| 16 | 21.500 | d3 | | |
| 17 | ∞ | 37.0 | | |
| 18 | −531.440 | 2.5 | 1.71736 | 29.52 |
| 19 | 43.000 | 9.0 | 1.51680 | 64.11 |
| 20 | −43.000 | 1.0 | | |
| 21 | 72.000 | 6.4 | 1.51680 | 64.11 |
| 22 | −72.000 | | | |

<Lens Group Interval>

| | Magnification | | |
|---|---|---|---|
| | 3.02 | 7.50 | 14.76 |
| d1 | 28.40 | 4.49 | 1.02 |
| d2 | 25.76 | 23.43 | 1.04 |
| d3 | 18.56 | 44.81 | 70.67 |

Figure 12:
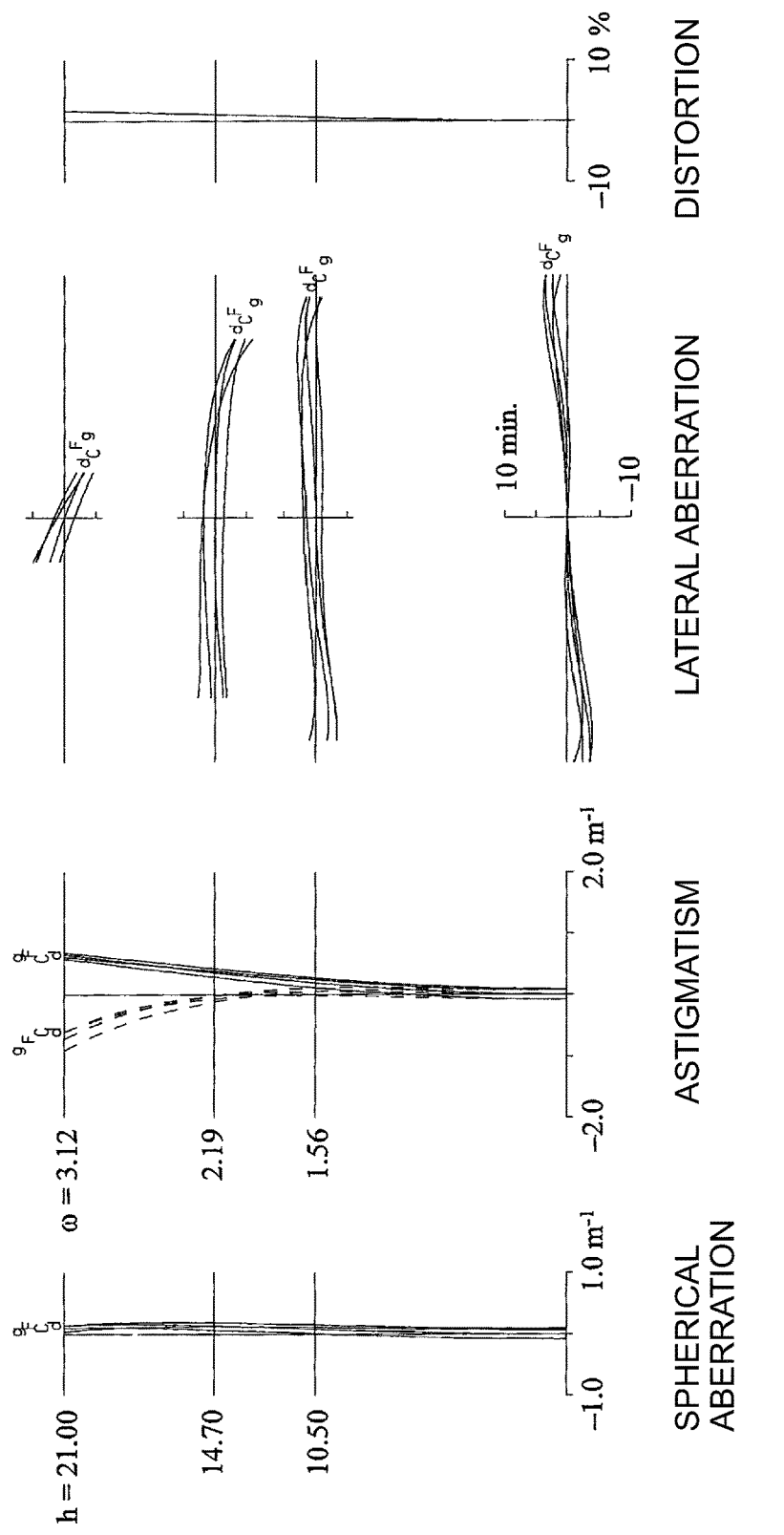
FIG. 12 is graphs showing various aberrations of the variable-power optical system at minimum magnification according to Example 3.
Figure 13:
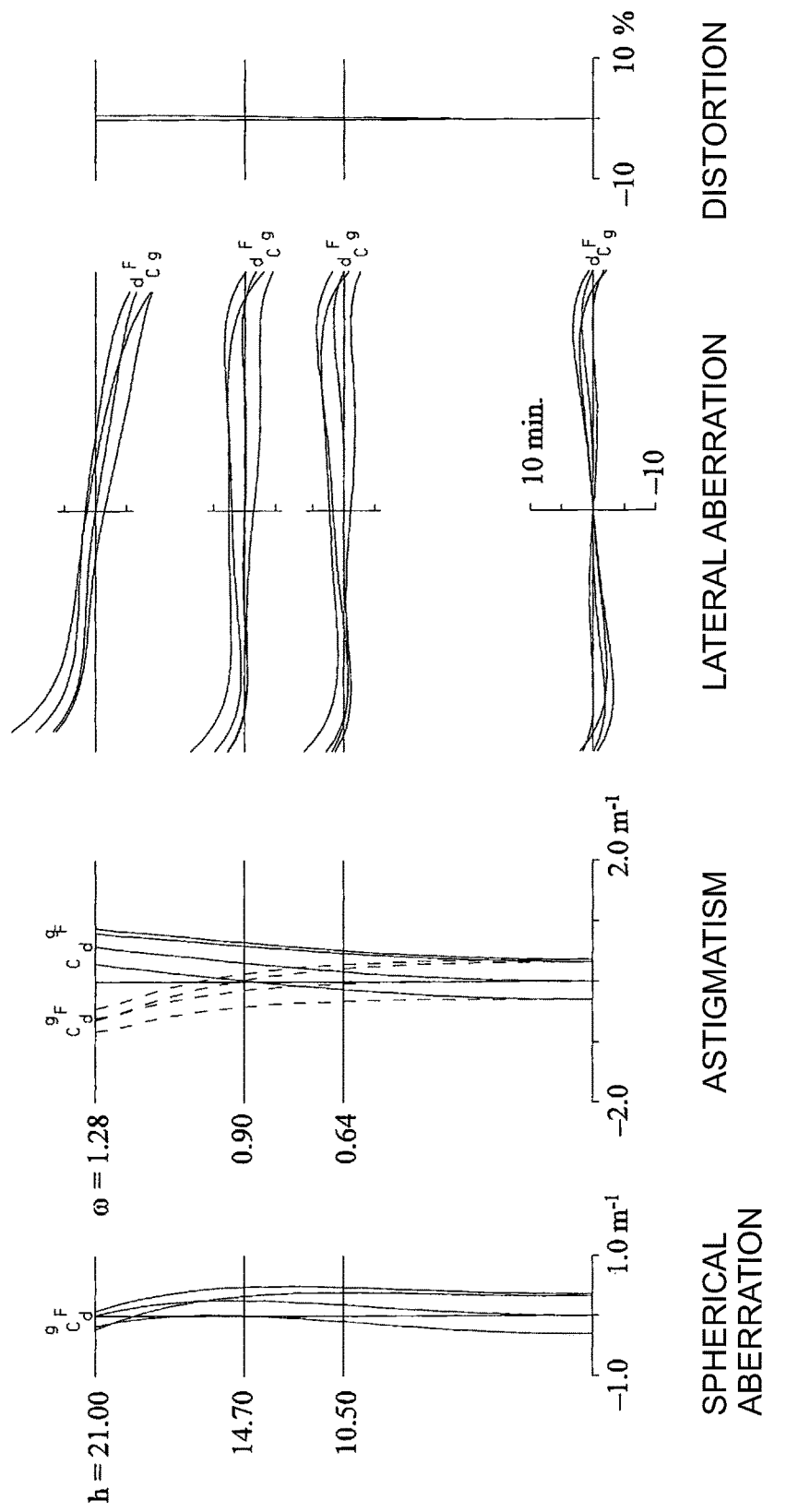
FIG. 13 is graphs showing various aberrations of the variable-power optical system at intermediate magnification according to Example 3.
Figure 14:
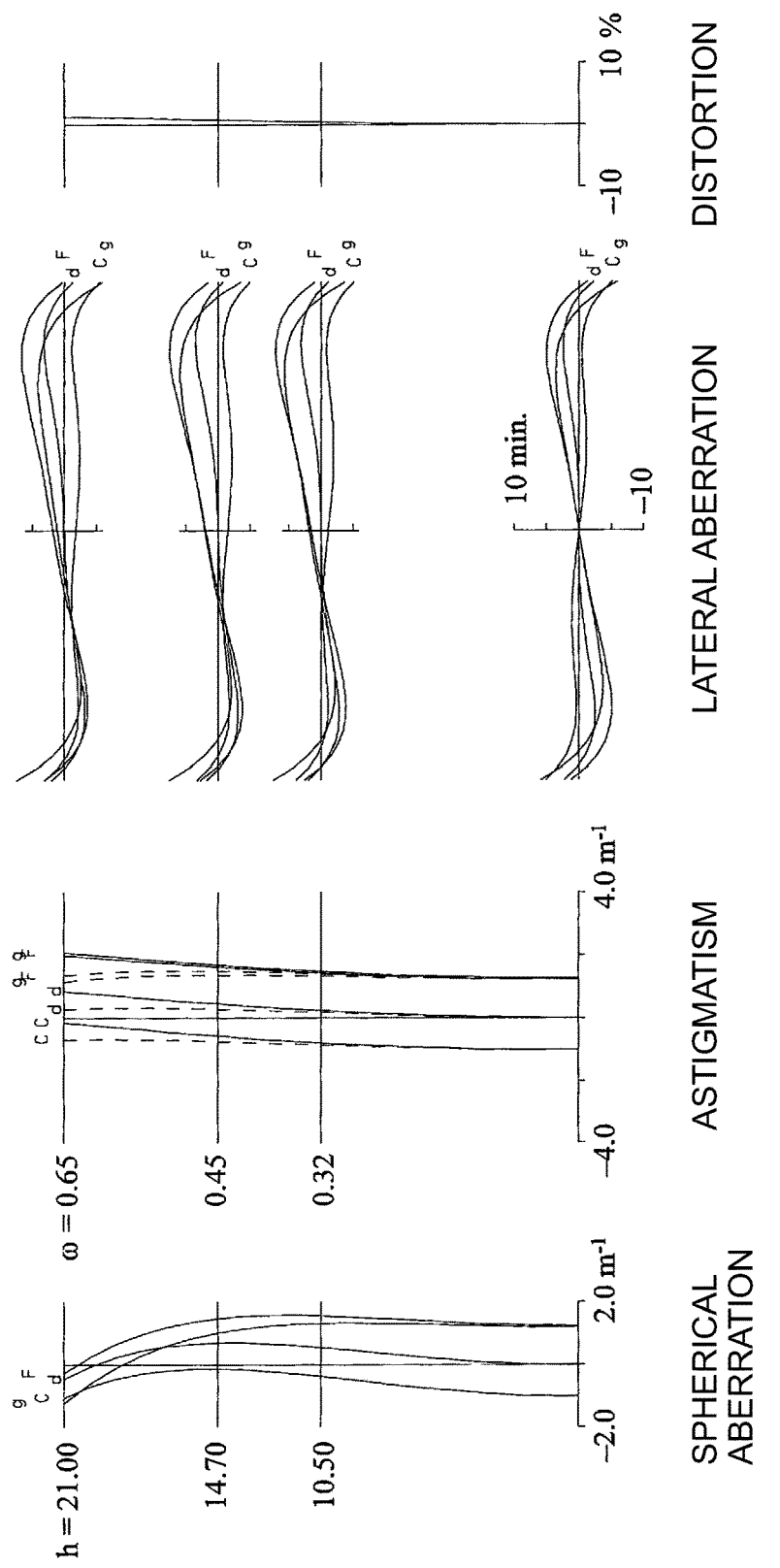
FIG. 14 is graphs showing various aberrations of the variable-power optical system at maximum magnification according to Example 3.

FIG. 12 is graphs showing various aberrations of the variable-power optical system OS3 at minimum magnification according to Example 3, FIG. 13 is graphs showing various aberrations of the variable-power optical system OS3 at intermediate magnification according to Example 3, and FIG. 14 is graphs showing various aberrations of the variable-power optical system OS3 at maximum magnification according to Example 3. From FIGS. 12 to 14, it is found that the variable-power optical system OS3 according to Example 3 is also provided with favorable aberration characteristics over the entire zoom range.

In addition, the present invention is not limited to the embodiments and Examples described above, and can be modified in various ways, and practiced. For example, in the embodiments and Examples described above, the relay optical system R is shown in which the relay optical system R is configured by three lens groups of the field lens group (first lens group) G1, the compensator lens group (second lens group) G2, and the variator lens group (third lens group) G3, and zoom magnification is varied by moving two lens groups thereamong, but the lens configuration of the relay optical system R according to the present invention is not limited to the description in the embodiments and Examples described above.

For example, the relay optical system R according to the present invention only needs to be configured so as to satisfy the conditional expressions (1) and (2). Specifically, all the lens groups (three lens groups in the embodiments and Examples described above) included in the relay optical system R can also be configured to be movable. Moreover, the relay optical system R may be configured by four or more lens groups. In this case, the relay optical system R is configured so as to vary the zoom magnification by moving part or all of the four or more lens groups (for example, five lens groups).

In any case, the relay optical system R according to the present invention only needs to be configured so as to realize technical ideas covered by the embodiments and Examples described above. In addition thereto, the configurations, the methods, and the like according to the embodiments and Examples described above can be appropriately modified and practiced without departing from the scope of the present invention.

EXPLANATION OF NUMERALS AND CHARACTERS

OS, OS1, OS2, OS3 Variable-power optical system
O Objective optical system
$I_1$ First image surface
R Relay optical system
$I_2$ Second image surface
E Eyepiece optical system
EP Eye point
G1 Field lens group (first lens group)
G2 Compensator lens group (second lens group)
G3 Variator lens group (third lens group)
$L_1$ Plano-convex lens (convex lens)
$L_{21}$ Concave meniscus lens (concave lens)
$L_{22}$ Biconvex lens (convex lens)
$L_{23}$ Biconvex lens (convex lens)
$L_{24}$ Concave meniscus lens (concave lens)
$CL_2$ Doublet (cemented lens)
$L_{31}$ Biconvex lens (convex lens, convex single lens)
$L_{32}$ Biconvex lens (convex lens)
$L_{33}$ Biconcave lens (concave lens)
$CL_3$ Doublet (cemented lens)
$L_{O1}$ Concave meniscus lens (concave lens)
$L_{O2}$ Biconvex lens (convex lens)
$L_{O3}$ Plano-convex lens (convex lens, convex single lens)
$L_{O4}$ Convex meniscus lens (convex lens, convex single lens)
$CL_O$ Doublet (cemented lens)
$L_{E1}$ Biconcave lens (concave lens)
$L_{E2}$ Biconvex lens (convex lens)
$L_{E3}$ Biconvex lens (convex lens, convex single lens)
$CL_E$ Doublet (cemented lens)

The invention claimed is:

1. A variable-power optical system comprising, in order from an object, an objective optical system, a relay optical system, and an eyepiece optical system,
   wherein the relay optical system is provided with, in order from the object consecutively, a first lens group having positive refractive power, a second lens group having positive refractive power, and a third lens group having positive refractive power, and is an optical system by which an image formed by the objective optical system is reimaged with variable optical power, and the following conditional expression (1) is satisfied:

$$0.7 < |\beta|_{min} < 1.4 \quad (1)$$

where $|\beta|_{min}$ denotes a minimum of absolute value of imaging magnification of the relay optical system.

2. The variable-power optical system according to claim 1, wherein the following conditional expressions (3) and (4) are satisfied:

$$0.8 < |\beta|_{min} < 1.3 \quad (3)$$

$$12.5 \text{ (mm)} < f_{min} < 14.5 \text{ (mm)} \quad (4)$$

where $f_{min}$ denotes a shortest focal length of the relay optical system.

3. The variable-power optical system according to claim 1, wherein the following conditional expressions (5) and (6) are satisfied:

$$0.2 < f_{min}/f_1 < 0.4 \quad (5)$$

$$0.7 < f_2/f_3 < 1.0 \quad (6)$$

where $f_{min}$ denotes a shortest focal length of the relay optical system, $f_1$ denotes a focal length of the first lens group, $f_2$ denotes a focal length of the second lens group, and $f_3$ denotes a focal length of the third lens group.

4. The variable-power optical system according to claim 1, wherein the third lens group comprises, in order from the object, a convex single lens, and a cemented lens which is configured by a convex lens and a concave lens and has negative refractive power.

5. The variable-power optical system according to claim 4, wherein the following conditional expressions (7) and (8) are satisfied:

$$1.6 < n_{31} < 1.8 \quad (7)$$

$$50 < v_{31} \quad (8)$$

where $n_{31}$ denotes a refractive index of the convex single lens, and $v_{31}$ denotes the Abbe number of the convex single lens.

6. The variable-power optical system according to claim 1, wherein imaging magnification of the relay optical system is varied by moving the second lens group and the third lens group in the relay optical system.

7. The variable-power optical system according to claim 1, wherein the relay optical system has a support part for supporting the first lens group in a predetermined position relative to the objective optical system.

8. The variable-power optical system according to claim 1, further comprising a tilt mechanism for tilting the relay optical system.

9. The variable-power optical system according to claim 1, wherein the following conditional expression (2) is satisfied:

$$12 \text{ (mm)} < f_{min} < 15 \text{ (mm)} \quad (2)$$

where $f_{min}$ denotes a shortest focal length of the relay optical system.

10. An optical apparatus comprising the variable-power optical system according to claim 1.

11. A variable-power optical system comprising, in order from an object, an objective optical system, a relay optical system, and an eyepiece optical system,
   wherein the relay optical system consists of, in order from the object, a first lens group having positive refractive power, a second lens group having positive refractive power, and a third lens group having positive refractive power, and is an optical system by which an image formed by the objective optical system is reimaged with variable optical power, and the following conditional expression (1) is satisfied:

$$0.7 < |\beta|_{min} < 1.4 \tag{1}$$

where $|\beta|_{min}$ denotes a minimum of absolute value of imaging magnification of the relay optical system.

12. The variable-power optical system according to claim 11, wherein the following conditional expressions (3) and (4) are satisfied:

$$0.8 < |\beta|_{min} < 1.3 \tag{3}$$

$$12.5 \text{ (mm)} < f_{min} < 14.5 \text{ (mm)} \tag{4}$$

where $f_{min}$ denotes a shortest focal length of the relay optical system.

13. The variable-power optical system according to claim 11, wherein the following conditional expressions (5) and (6) are satisfied:

$$0.2 < f_{min}/f_1 < 0.4 \tag{5}$$

$$0.7 < f_2/f_3 < 1.0 \tag{6}$$

where $f_{min}$ denotes a shortest focal length of the relay optical system, $f_1$ denotes a focal length of the first lens group, $f_2$ denotes a focal length of the second lens group, and $f_3$ denotes a focal length of the third lens group.

14. The variable-power optical system according to claim 11, wherein the following conditional expression (2) is satisfied:

$$12 \text{ (mm)} < f_{min} < 15 \text{ (mm)} \tag{2}$$

where $f_{min}$ denotes a shortest focal length of the relay optical system.

* * * * *